United States Patent
Ricco et al.

(10) Patent No.: US 7,100,581 B2
(45) Date of Patent: Sep. 5, 2006

(54) GAS FEEDING SYSTEM FOR AN INTERNAL COMBUSTION ENGINE, HAVING A PRESSURE REDUCING VALVE CONNECTED TO THE INTAKE MANIFOLD

(75) Inventors: Mario Ricco, Orbassano (IT); Sisto Luigi De Matthaeis, Orbassano (IT); Claudio Amorese, Orbassano (IT); Dario Manodoro, Orbassano (IT); Raffaele Ricco, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 11/053,875

(22) Filed: Feb. 10, 2005

(65) Prior Publication Data

US 2005/0252495 A1 Nov. 17, 2005

(30) Foreign Application Priority Data

May 12, 2004 (EP) .................................. 04425340

(51) Int. Cl.
*F02M 37/04* (2006.01)
(52) U.S. Cl. ...................................... 123/529; 123/527
(58) Field of Classification Search ........... 123/184.21, 123/527, 518, 519, 529, 526, 575
See application file for complete search history.

(56) References Cited

U.S. PATENT DOCUMENTS 2,781,752 A * 2/1957 Van Den Bussche ....... 123/525
5,755,210 A 5/1998 Sato et al.
5,868,121 A 2/1999 Brown et al.
6,578,560 B1 * 6/2003 Ricco ......................... 123/527
2003/0168101 A1 9/2003 Sulatisky et al.

FOREIGN PATENT DOCUMENTS

| EP | 0 155 538 | 2/1985 |
|---|---|---|
| EP | 0 309 044 | 3/1989 |
| WO | WO 99/15784 | 4/1999 |

* cited by examiner

Primary Examiner—Stephen K. Cronin
Assistant Examiner—Hyder Ali
(74) Attorney, Agent, or Firm—Nixon & Vanderhye P.C.

(57) ABSTRACT

In a gas-supply system for internal-combustion engines, a pressure-reducing valve is arranged between the reservoir of the gas and a distribution manifold or rail that feeds the gas to a series of electromagnetically controlled injectors associated to the various cylinders of the engine. The pressure-reducing valve has an internal chamber for collection of any leakage of gas which is connected to the intake manifold of the internal-combustion engine so as to enable the leaked gas to be discharged in the engine. A solenoid shutoff valve is arranged in the connection to the intake manifold and is opened automatically upon ignition of the engine.

9 Claims, 7 Drawing Sheets

GAS FEEDING SYSTEM FOR AN INTERNAL COMBUSTION ENGINE, HAVING A PRESSURE REDUCING VALVE CONNECTED TO THE INTAKE MANIFOLD

BACKGROUND OF THE INVENTION

1. Field of the Invention

The present invention relates to systems for supplying gas, in particular compressed natural gas, such as for example methane, for internal-combustion engines, of the type comprising:
- a plurality of electromagnetically controlled injectors, associated to the various cylinders;
- a distribution manifold or "rail" communicating with said injectors;
- a reservoir for supply of the rail, where pressurized gas is accumulated; and
- a pressure-reducing valve set in connection between the reservoir and the aforesaid rail.

2. Prior Art

Figure 1:
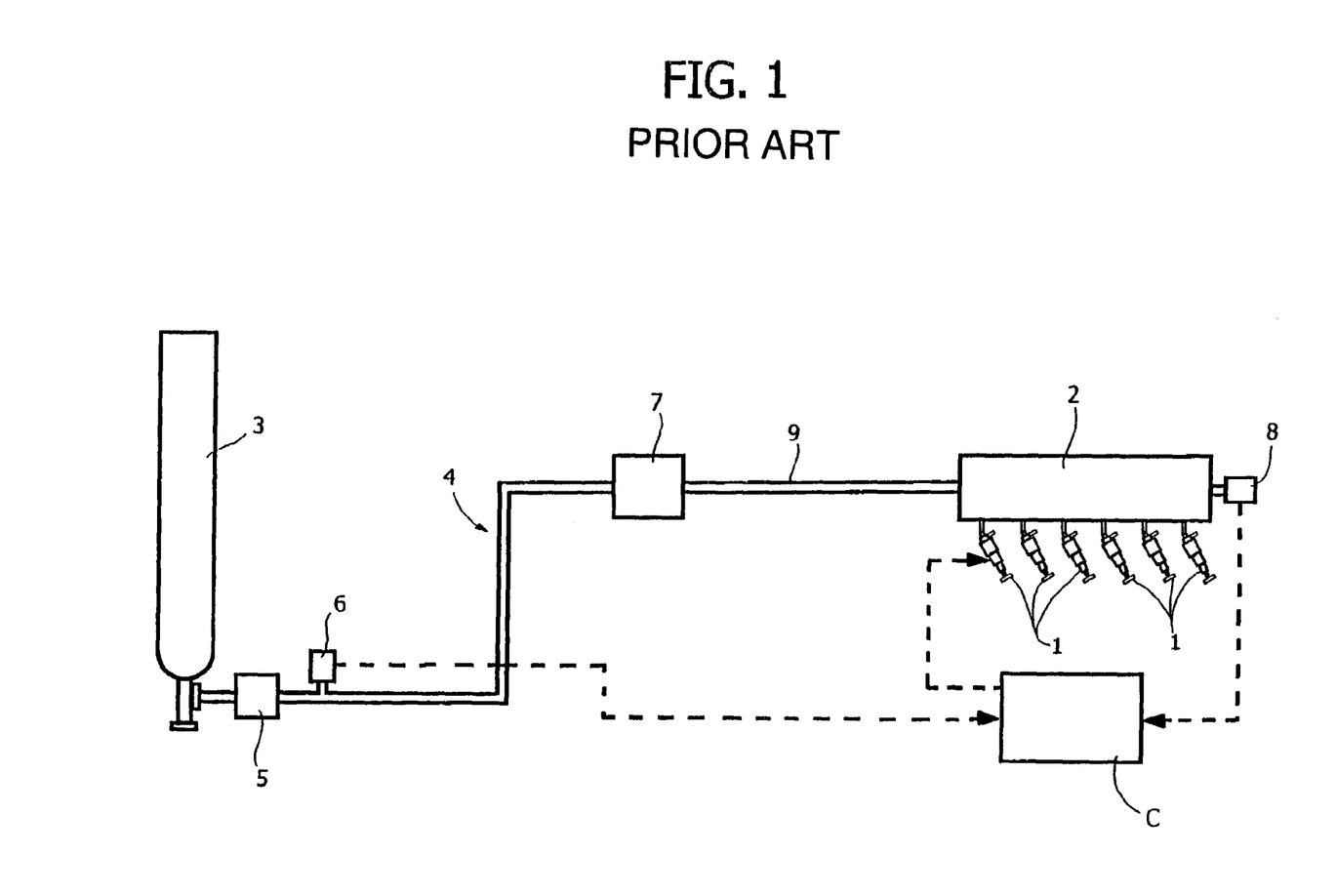
FIG. 1 is a diagram, already described, of a supply system according to the known art.

A supply system of the known type referred to above is illustrated in FIG. 1 of the annexed plate of drawings. In said figure, the reference number 1 designates the electromagnetically controlled injectors associated to the various cylinders of the engine, which are supplied with pressurized gas by a distribution manifold or rail 2. The reference number 3 designates a gas cylinder, which functions as a reservoir, in which pressurized gas, for example methane, is accumulated. The outlet of the gas cylinder 3 is connected via a pipe 4 to the rail 2. In the pipe 4 are set, in series: a safety valve 5, constituted by a solenoid shutoff valve designed to block the outlet of the gas cylinder 3; a pressure sensor 6; and a pressure-reducing valve 7. The reference number 8 designates a sensor of the pressure in the distribution manifold or rail 2.

In the case, for example, of a methane supply system, the initial pressure of the methane inside the gas cylinder 3, when the latter is full, is in the region of 200 bar. Said pressure of course drops as the gas cylinder 3 empties, until a minimum value in the region of 20 bar is reached.

At the same time, the electromagnetically controlled injectors 1 are able to operate at sensibly lower gas pressures, normally lower than 10 bar. The purpose of the valve 7 is precisely to bring the pressure of the gas to a suitable value for proper operation of the injectors 1. In the practical case, currently used pressure-reducing valves bring the pressure of the gas in the pipe 9 downstream of the pressure-reducing valve 6, which takes the gas to the rail 2, to a pressure value which oscillates (as the pressure of the gas coming from the pipe 4 varies) between approximately 6.3 bar and 8.5 bar.

The present invention relates in particular to the systems for supplying gas of the type illustrated above, in which the pressure-reducing valve comprises:
- a valve body, with an inlet connector connected to the reservoir and an outlet connector connected to the rail;
- a restricted passage defined inside the valve body for communication between the aforesaid inlet connector and the aforesaid outlet connector;
- an open/close element for control of the communication through said restricted passage;
- means for return of the open/close element tending to keep the open/close element in an open condition; and
- a piston member, mobile inside the valve body, for controlling said open/close element, said piston member being subject to the pressure of the gas downstream of the aforesaid restricted passage.

Figure 2:
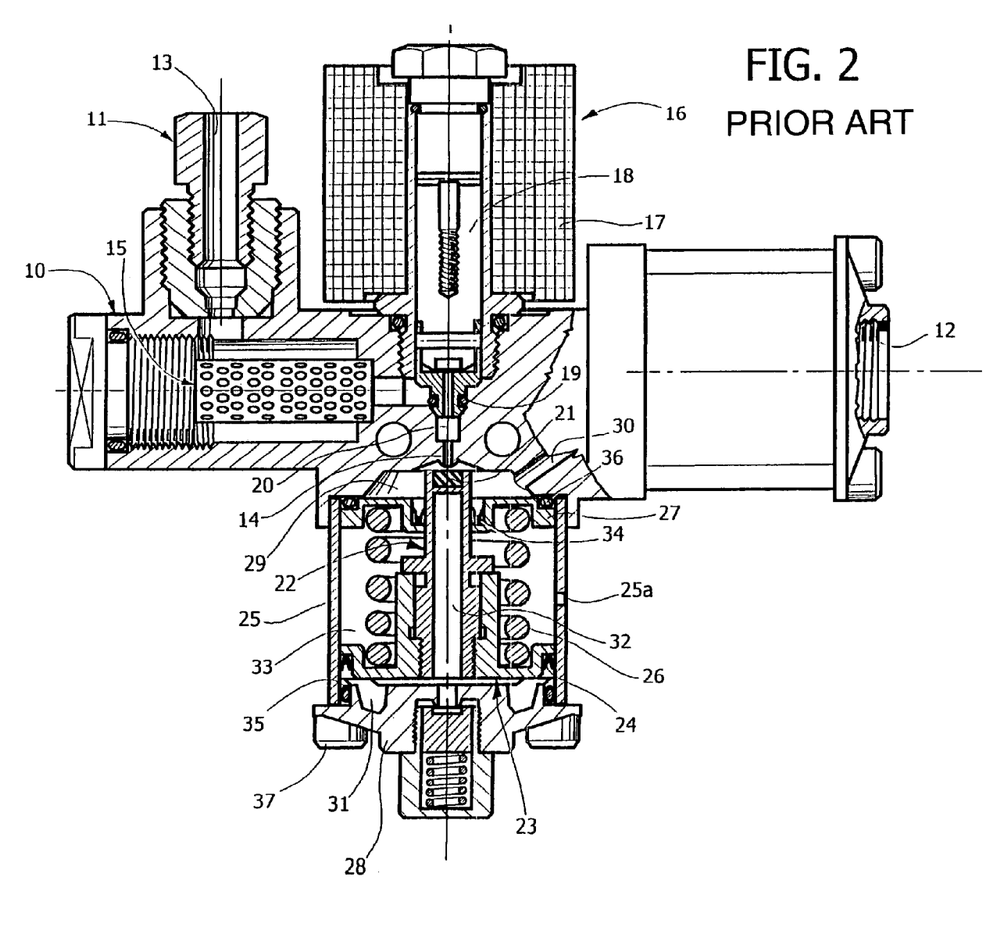
FIG. 2 is a partially sectioned view, already described, of a pressure-reducing valve according to the known art.

FIG. 2 of the annexed plate of drawings illustrates a pressure-reducing valve of a known type used in supply systems of the type referred to above. The example illustrated relates to the case of a valve that provides two successive stages of pressure reduction set in cascaded fashion. The body of the valve is designated by the reference number 10. The number 11 designates the inlet connector, designed to be connected to the pipe (FIG. 1) through which the gas coming from the reservoir under pressure 3 flows, whilst the reference number 12 designates the outlet opening, in which there is designed to be mounted the connector for connection to the pipe 9 that takes the gas at reduced pressure to the rail 2 (FIG. 1). The connector 11 defines an inlet passage 13 that communicates with the outlet 12 through a series of passages made inside the body 10, as will be defined further in what follows. Set in said series of passages is a restricted passage 14 associated to the first stage of the valve. The gas that enters the valve through the inlet passage 13, arrives at the restricted passage 14 passing through a filter 15 and an electromagnetically controlled safety shutoff valve. The solenoid valve 16 comprises a solenoid 17 that is able to recall an anchor 18 into a retracted position, in which an open/close shutoff element 19 is disengaged from a respective valve seat, leaving a passage 20 that converges into the restricted passage 14 free. The restricted passage 14 gives out onto a spherical surface, functioning as valve seat, which co-operates at the front with an open/close element 21 constituted by a seal element mounted at a free end of a stem 22 of a piston member 23. The latter has a bottom head (as viewed in FIG. 2) of widened diameter, which is slidably mounted, with the interposition of a seal gasket 24, within a cylindrical liner 25 fixed to the body of the valve. A helical spring 26 is set between the bottom head of the piston member 23 and a fixed cup 27. The spring 26 tends to keep the piston member 23 in its end-of-travel position downwards (illustrated in the drawing), in which the bottom head of the piston member 23 is in contact with a bottom element 28 for closing the cylinder liner 25 and in which the open/close element 21 is set at a distance from the outlet of the restricted passage 14, so that in said condition the gas that arrives at the restricted passage 14 from the inlet passage 13 can pass into a chamber 29 that is set downstream of the restricted passage 14, after undergoing a consequent pressure drop. From the chamber 29, the gas flows, via an intermediate passage 30, to a second stage of the valve, which is identical to what has been described above from a functional standpoint, via which the gas finally reaches the outlet opening 12. In what follows, said second stage of the valve will not be further illustrated, since it corresponds, as has been said, to the first stage. To return now to the structure and to the operation of the first stage of the pressure-reducing valve, the gas that arrives in the chamber 29, in addition to flowing towards the outlet through the passage 30, also reaches a chamber 31 facing the opposite end of the piston member via an axial passage 32 made through the piston member 23 and through radial holes provided in the wall of the stem of the piston member. The chamber 33, in which the spring 26 is set, is in communication with the external atmosphere through holes 25a provided in the wall of the cylinder liner 25. Consequently, the seal gasket 24 performs the function of preventing the gas present in the chamber 31 from being able to leak into the chamber 33 and from there come out into the external atmosphere. A similar function is performed by a seal gasket 34 provided in a position corresponding to a central hole of the fixed cup 27 functioning as guide for the sliding movement of the stem 22 of the piston member 23. Also said gasket in fact prevents the gas present in the chamber 14 from possibly passing into the chamber 33 and from there into the external atmosphere. The seal gaskets 24 and 34 are designed obviously taking into account the fact that they are set between surfaces in relative motion, i.e., they are gaskets of a dynamic type. Static gaskets 35, 36, constituted by seal rings made of elastomeric material, are instead set between the closing element 28 and the bottom end of the cylinder liner 25 and between the fixed cup 27 and the body of the valve.

In operation, the gas coming from the inlet passage 13 passes initially straight into the chamber 29 through the restricted passage 14, undergoing a pressure reduction through the solenoid valve 16 in its initial opening phase, and is thus sent at reduced pressure to the passage 30, from which it passes to a second pressure-reducing stage, or directly to the outlet of the valve (in the case of the valve being a single-stage one). As the pressure in the chamber 29 increases, however, said pressure is also communicated to the chamber 31 located at the opposite end of the piston member 23. On account of the larger effective area at the surface of the head of the piston member 23 facing the chamber 31, when the pressure in the chamber 31 reaches the calibration pressure value, i.e., the reduction pressure of the first stage, the pressure of the chamber 31 tends to bring about raising (as viewed in the drawing) of the piston member 23 against the action of the spring 26 until it brings about closing of the open/close element 21 against its seat. The open/close element thus remains closed until the pressure in the chamber 29, and consequently in the chamber 31, drops back to a value such that the spring causes opening of the open/close element. There is thus brought about a continuous oscillation of the open/close element between the open condition and the closed condition, which keeps the pressure in the pipe 30 downstream of the first reduction stage within a required range of values. As has already been said, the operation described above is repeated a second time at the second stage of the valve, in the case where the valve is a dual-stage one, as in the example illustrated in the figure, whilst the gas that arrives at the pipe 30 is sent directly to the rail in the case of a single-stage valve.

Drawbacks of the Prior Art

In the known valves of the type described above, it is necessary for the dynamics of variation of the regulated pressure not to exceed ±10%, in order to guarantee proper operation of the injection system. With reference to FIG. 1 of the annexed plate of drawings, the pressure sensor 8 sensitive to the pressure in the rail 2 sends its signal to an electronic control unit C, which receives also the output signal from the pressure sensor 6 set immediately downstream of the reservoir 3, and controls the injectors 1 and in particular their opening time according to the supply pressure.

Figure 3:
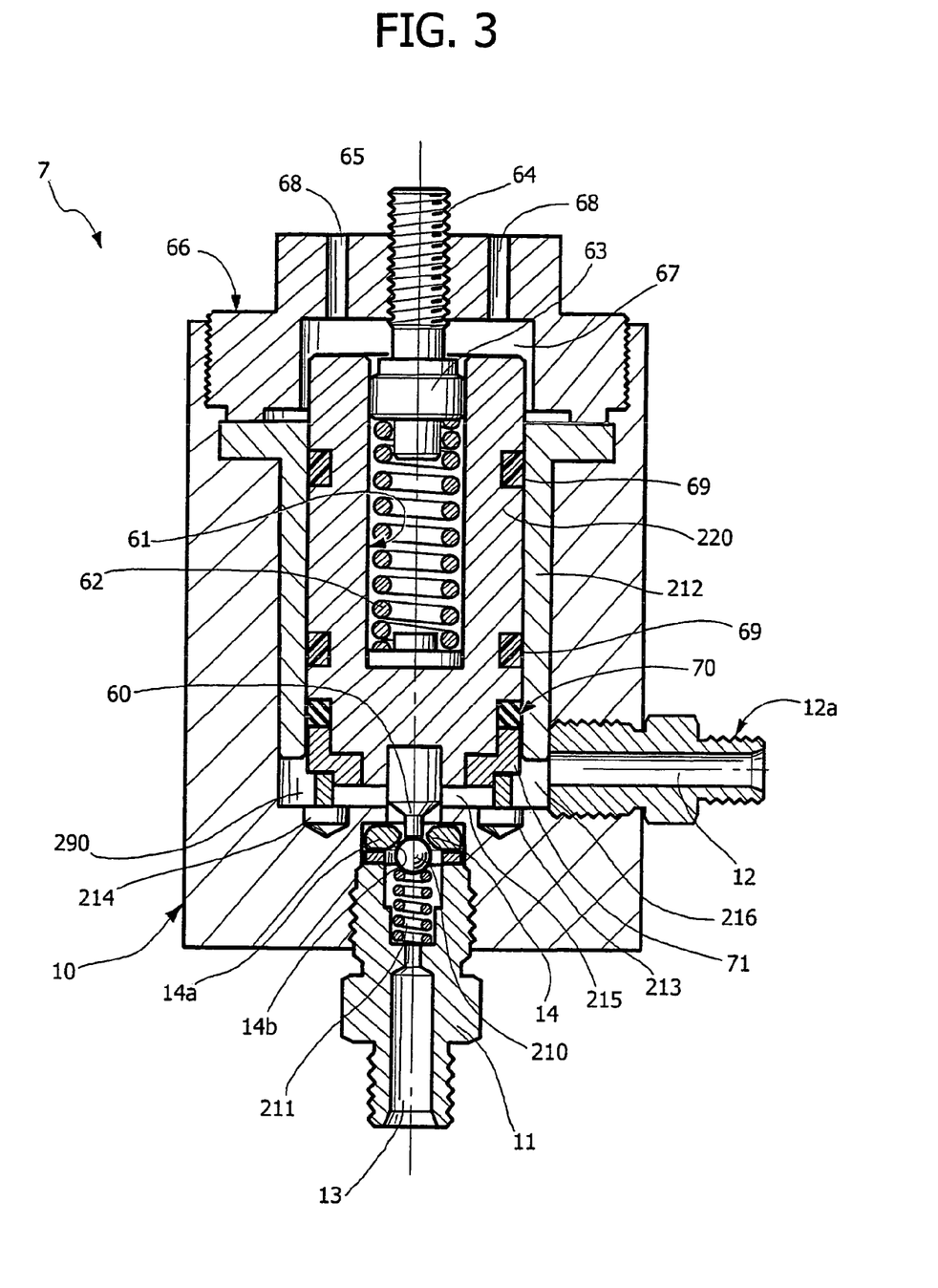
FIG. 3 is a cross-sectional view of an example of embodiment of a pressure-reducing valve, already previously proposed by the present applicant in a co-pending patent application.

In order to limit the sensitivity of the regulated pressure to the pressure of the reservoir and to the flow rate, it is consequently necessary to adopt, in the valve 10 illustrated in FIG. 2, a spring 26 of high load, which accordingly has a large size. This entails the adoption of the geometry illustrated in FIG. 2, with the consequent need to provide two seal gaskets 24, 34 of a dynamic type. It should also be noted that the structure of the cylinder liner 25, within which the piston member 23 is slidably mounted, is at times subject to deformations following upon tightening of the screws 37, which fix the closing element 28 and the cylinder liner 25 to the body of the valve. Possible deformations of the structure increase the risk of leakage of gas towards the outside. Of course, in the case of a dual-stage valve, the aforesaid drawbacks are twice as many.

Basically then, the valve of a known type proves cumbersome, not altogether reliable with respect to the risk of leakage of gas into the external atmosphere, and finally also has a relatively complicated and costly structure. In addition to this, the valve described above does not enable an optimal response during the transient regimes. There is finally the risk of a deterioration of the load of the spring over time, with consequent variation of the regulated pressure.

Purpose of the Invention

The purpose underlying the present invention is to provide a supply system of the known type described above which will enable the drawbacks referred to above to be overcome and which, more in general, will have a relatively simple and low-cost structure and which, notwithstanding this, will guarantee an operation that is efficient and reliable and which will moreover be safer as regards the risk of leakage of gas into the external atmosphere.

The Invention

With a view to achieving the above and further purposes, the subject of the invention is a gas-supply system for an internal-combustion engine, having all the characteristics indicated in the annexed claim 1.

Further preferred characteristics and advantageous of the invention are specified in the dependent claims.

BRIEF DESCRIPTION OF THE FIGURES

Further characteristics and advantages of the invention will emerge from the ensuing description with reference to the annexed plate of drawings, which are provided purely by way of non-limiting example, and in which.

DETAILED DESCRIPTION OF SOME PREFERRED EMBODIMENTS OF THE INVENTION

The present applicant has already proposed, in a co-pending patent application, which is still secret at the date of filing of the present patent application, a supply system of the type illustrated in FIG. 1, in which, however, the pressure-reducing valve 7 is obtained in accordance with what is illustrated by way of example in FIG. 3. In said figure, the parts that correspond to those of FIG. 2 or have a similar function are designated by the same reference numbers.

Also the valve of FIG. 3 has a valve body 10, within which a restricted passage 14 is defined, set in communication between an inlet passage 13 made in an inlet connector 11 and an outlet passage 12 made in an outlet connector 12a. The connector 11 is designed to be connected to the pipe 4 (FIG. 1), which carries the gas coming from the reservoir 3. The connector 12a is designed to be connected to the pipe 9 that takes the gas at reduced pressure to the rail 2. The example illustrated in FIG. 3 relates to a single-stage valve that performs a single pressure jump. However, nothing prevents a valve being envisaged that has two arrangements of the type illustrated in FIG. 3 in series, to perform two pressure jumps in succession.

In the case of the example illustrated in FIG. 3, the restricted passage 14 is defined by a ring made of metal or of appropriate plastic material 14a pressed against the end surface of a seat that is made in the body 10 of the valve by the connector 11, which is screwed inside the body 10. The ring 14a, in addition to defining the restricted passage 14, also defines a conical surface 14b, which functions as valve seat for a ball-type open/close element 210, preferably made of metal material, which is pressed against the valve seat 14b by an auxiliary spring 211 that is set between the ball-type open/close element 210 and a contrast surface defined by the connector 11.

The valve body 10 has an internal cylindrical cavity, within which there is fixed a cylindrical bushing 212 functioning as guide for the sliding movement of a piston member 220. The piston member 220 has a generally cylindrical conformation and has a front end facing a chamber 290 that is set downstream of the restricted passage 14 and that communicates with the outlet passage 12. On the front end, the piston member 220 is provided with a cap 60 to push the ball-type open/close element 210 towards its opening position, against the action of the spring 211 with high flexibility and low preload, which has the sole function of keeping the ball-type open/close element 210 in position. For this purpose, the body of the piston member 220 has a blind axial hole 61, extending from the top end surface (as viewed in the drawing) of the piston member 220, within which a helical spring 62 is mounted. The helical spring 62 has one end pressed against the end surface of the blind axial hole 61 and the opposite end pressed by a closing element 63 that is withheld in position by means of a threaded grub-screw 64, which is screwed within a threaded hole 65 of a ring nut 66, which is in turn screwed within the end of the valve body 10 opposite to the one on which the inlet connector 13 is mounted. The top end of the piston member 220 faces a chamber 67, defined by the ring nut 66, which communicates with the external atmosphere through holes 68 made in the ring nut.

In the case of the example illustrated, the body of the piston member 220 has two grooves, within which are mounted two rings made of a material with a low coefficient of friction, for example PTFE, designated by the reference number 69, for the purpose of guiding and facilitating sliding of the piston member 220 within the guide bushing 212. Furthermore, the piston member 220 is provided with an annular seal gasket of a dynamic type 70, which is pressed between an annular contrast surface defined on the outer surface of the piston member 220 and a ring 71 fixed in any way (for example screwed) on the bottom end of the piston member 220.

The ring 213 defines the position of arrest of the piston member 220, and the holes 214 enable in any case communication of the chamber 215, which is in communication with the inlet passage 13, with the chamber 216, which is in communication with the outlet passage 12.

Operation of the pressure-reducing valve described above is illustrated in what follows.

In the resting condition, the spring 62 pushes the open/close element 210 into its opening position, against the action of the spring 211. The gas coming from the reservoir 3 (FIG. 1) reaches the inlet connector 11, and consequently passes through the restricted passage 14 and from there into the chamber 290. From the chamber 290 the gas reaches, through the outlet connector 12 and the pipe 9 (FIG. 1), the rail 2, with a pressure value adequate for proper operation of the injectors 1.

Under the action of the pressure in the chamber 290, however, the piston member 220 is displaced, against the action of the spring 62, in the direction of the opposite chamber 67 (which is at atmospheric pressure) until it enables closing of the open/close element 210 against the valve seat 14b. When the pressure in the chamber 290 drops back to the value of the reduced pressure of calibration, the spring 62 again manages to displace the piston member 220 into the position in which it causes opening of the open/close element 210. In this way, the pressure in the chamber 290 varies cyclically, remaining in any case within a range of reduced values adequate for proper operation of the injectors.

A comparison of the principle of operation of the valve of FIG. 3 with that of the known valve of FIG. 2 shows clearly that a chief difference between said valves lies in the fact that, in the case of the valve of FIG. 3, the piston member 220 is subject to the pressure of the gas downstream of the restricted passage 14 only in a position corresponding to one of its ends, whereas in the case of the known valve of FIG. 2, said pressure was communicated to both ends of the piston member, and the difference in useful area of said ends was exploited to cause closing of the open/close element as said pressure downstream of the restricted passage increased. Furthermore, in the case of the valve of FIG. 3 the open/close element does not move with the piston member as in the valve of FIG. 2, and is pushed into the opening position by the piston member as a result of a force exerted on the latter by the spring 61. The pressure that is created in the chamber downstream of the restricted passage 14 tends, instead, to push the piston member, acting only on one of its ends, towards a position in which it enables closing of the open/close element.

As a result of the aforesaid geometry, the valve of FIG. 3 consequently does not call for the use of a strongly loaded spring having the cumbersome dimensions of the spring 26 of the valve of FIG. 2, and consequently has a simpler and less voluminous structure and in particular does not call for the use of two seal gaskets of a dynamic type as in the case of the valve of FIG. 2. In order to prevent the risk of leakage of the gas into the external atmosphere, a single seal gasket 70 of a dynamic type is in fact sufficient, set in a position corresponding to the surface of sliding contact between the piston member 220 and the corresponding guide bushing 212. It follows that the valve of FIG. 3, in addition to being simpler and less cumbersome, is also safer as regards the risk of leakages of gas to the outside environment.

A further drawback of the known valve of FIG. 2 that is eliminated in the valve of FIG. 3 consists in the possibility of adopting gaskets that are able to guarantee an efficient operation also with major thermal swings.

Figure 4:
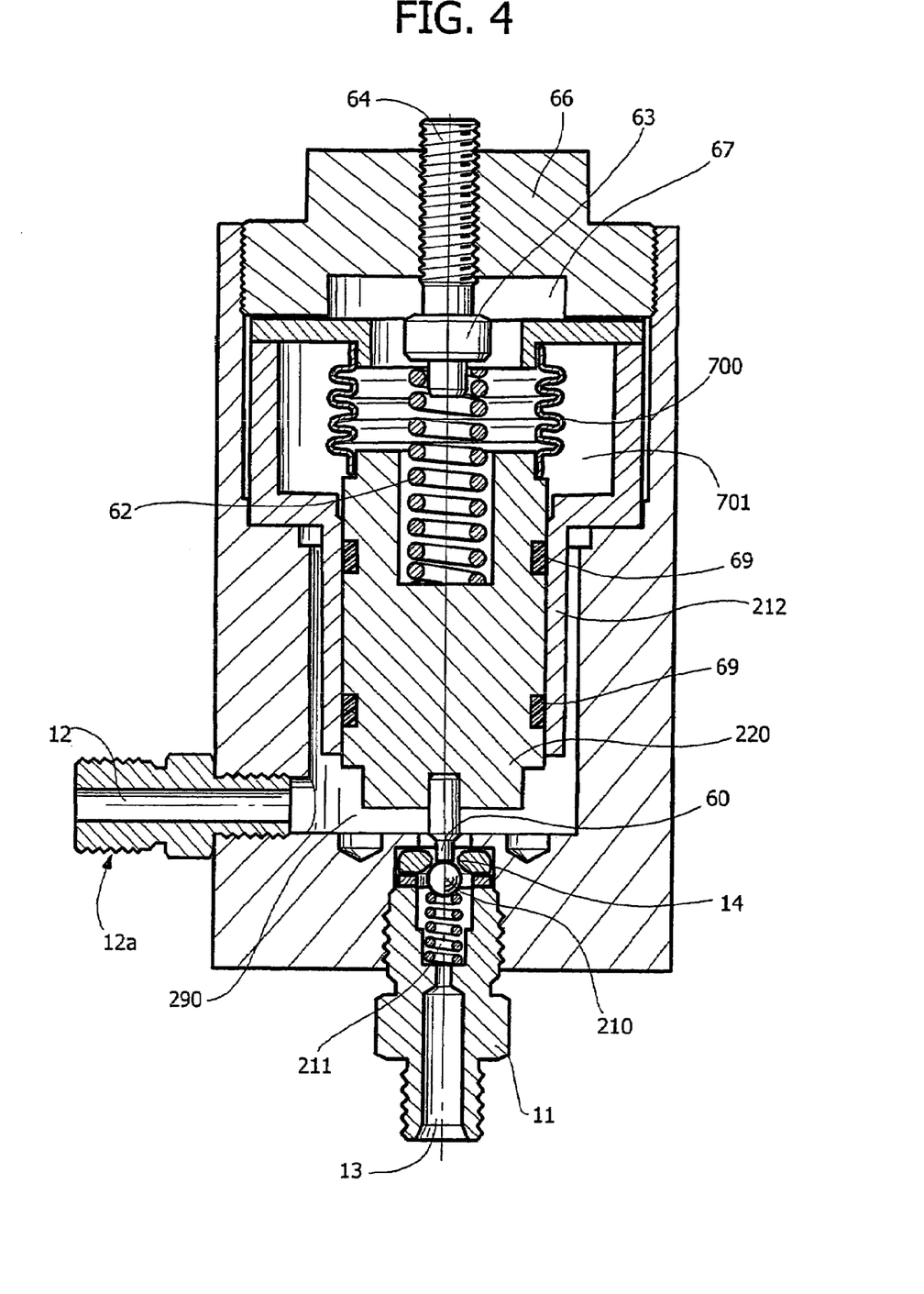
FIG. 4 illustrates a variant of FIG. 3.

FIG. 4 illustrates a valve substantially identical to the valve of FIG. 3 with the only difference of presenting, as seal device, instead of the annular seal device 70, the tubular bellows-type boot 700, having one end secured to the fixed body of the valve and the opposite end secured to one end of the piston member, in such a way that the boot 700, with its deformations, is able to follow the movements of the piston member. Said boot separates an annular chamber 701 that surrounds it, within which gas coming from the chamber 290 can leak, from the space inside the boot, which communicates instead with the chamber 67 at atmospheric pressure.

Figure 5:
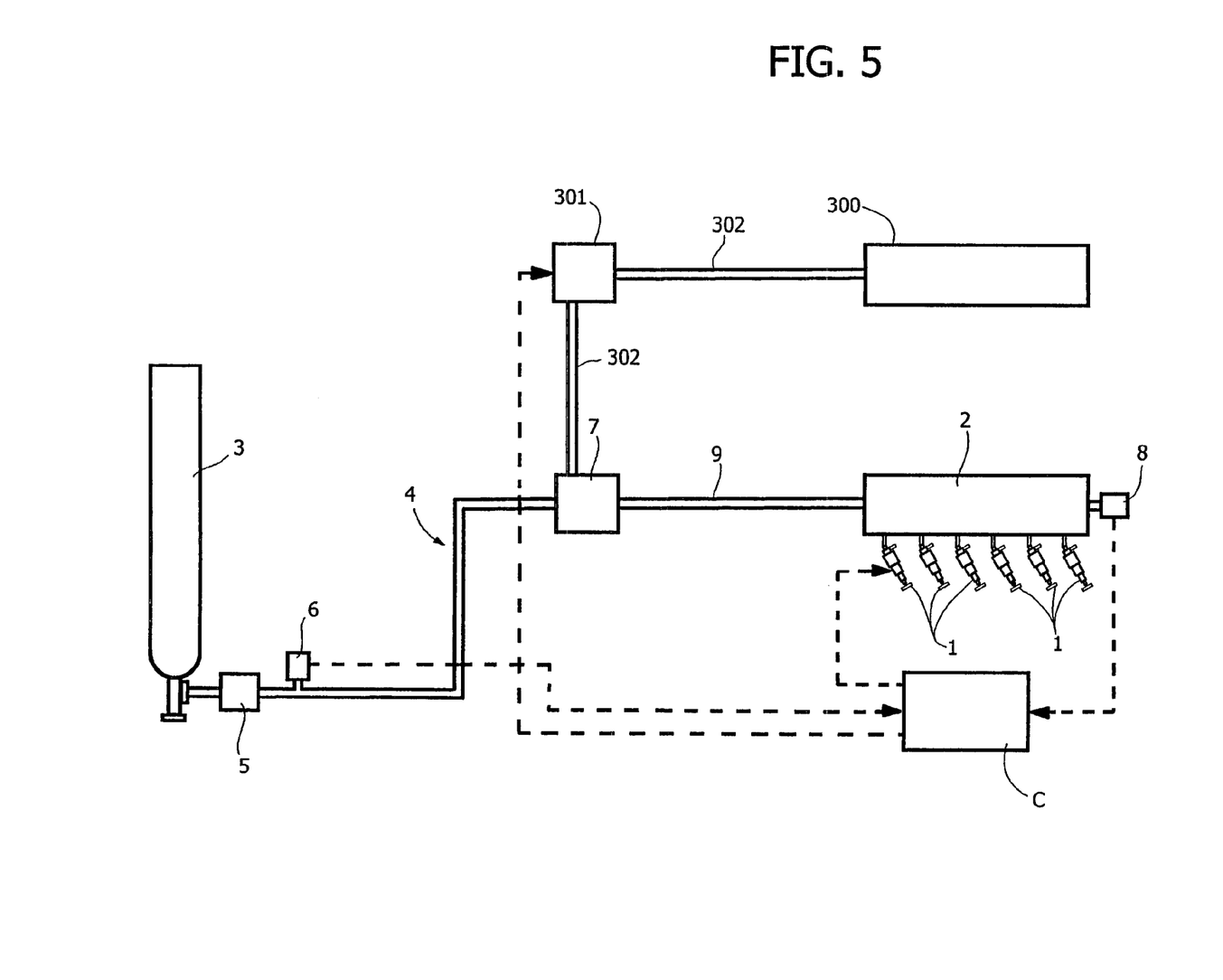
FIG. 5 illustrates a diagram of the supply system according to the invention.

FIG. 5 illustrates a system for supplying gas to an internal-combustion engine, according to the present invention. In FIG. 5, the parts corresponding to those of FIG. 1 are designated by the same reference number. The difference of the system according to the invention with respect to the conventional one illustrated in FIG. 1 consists in the fact that, there is envisaged therein a pressure-reducing valve 7 (which can be of any type, hence even a valve according to the known art, but that preferably is of the type that has been illustrated with reference to FIG. 3) connected to the air-supply system of the internal-combustion engine and, more particularly, to the intake manifold 300 (illustrated only schematically in FIG. 5) of the internal-combustion engine.

In the preferred case, the regulation valve 7 is of the type illustrated in FIG. 3. In this case, the intake manifold of the internal-combustion engine is connected, via a connection line 302, to the chamber 67 of the valve 7. Consequently, said chamber 67 is not vented to the external environment, as in the case illustrated in FIG. 3. The aforesaid connection guarantees that, in any case, any flow of gas that leaks from the chamber 216 to the chamber 67 of the valve 7 (FIG. 3), notwithstanding the seal ring 70, is will not come out into the external atmosphere, but rather is drawn back into to the internal-combustion engine through the intake manifold. For proper operation of the system, in the connection pipe 302 there is set a solenoid shutoff valve 301, which is controlled by the electronic control unit C in such a way that said solenoid valve closes the communication through the line 302 when the key to start the engine of the motor vehicle is in the "off" position, whilst it opens the aforesaid communication when the key is in the ignition position.

Figure 6:
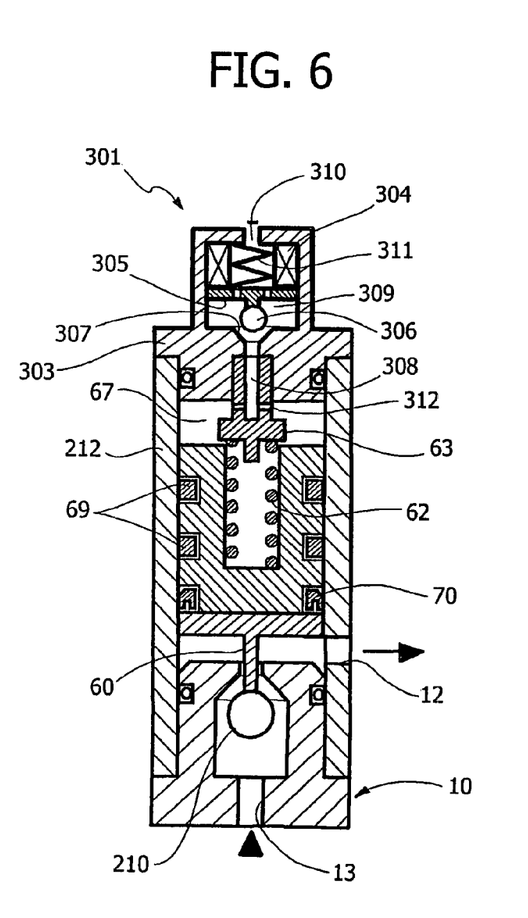
FIGS. 6 and 7 are schematic views of a pressure-reducing valve with shutoff valve incorporated, usable in the system of the invention, and illustrated in two different operating conditions.
Figure 7:
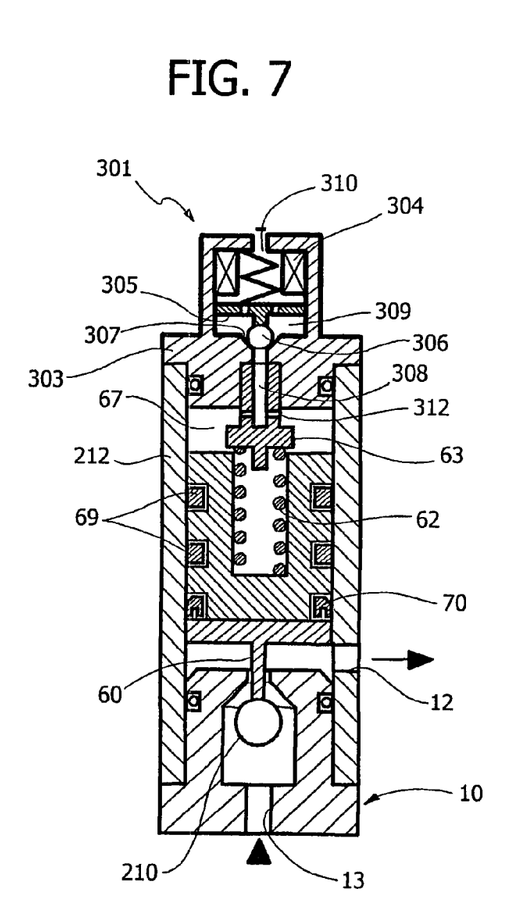

FIGS. 6 and 7 illustrate schematically how the valve 7 can be modified for the purpose of incorporating therein the shutoff valve 301. As may be seen, the valve 301 has a body 302, which is connected at one end to the body of the valve 7 and has inside it a solenoid 304 that controls the position of an anchor 305 bearing a ball-type open/close element 306 that co-operates with a valve seat 307 defined by one end of an axial through hole 308 made in the body 303, which sets in connection the chamber 67 with a chamber 309, which is made inside the body 303 and is connected, via an outlet opening 310, to the line 302. A spring 311 keeps the open/close element 306 in a normally closed position, whilst the solenoid 304, when it is excited, attracts towards itself the anchor 305 so as to bring the open/close element 306 into the opening position. The element 63, which functions as support for the spring 62, has passages 312 that set the chamber 67 in connection with the axial hole 308.

FIG. 6 shows the solenoid shutoff valve in the open condition, whilst FIG. 7 shows the solenoid shutoff valve in the closed condition.

Figure 8:
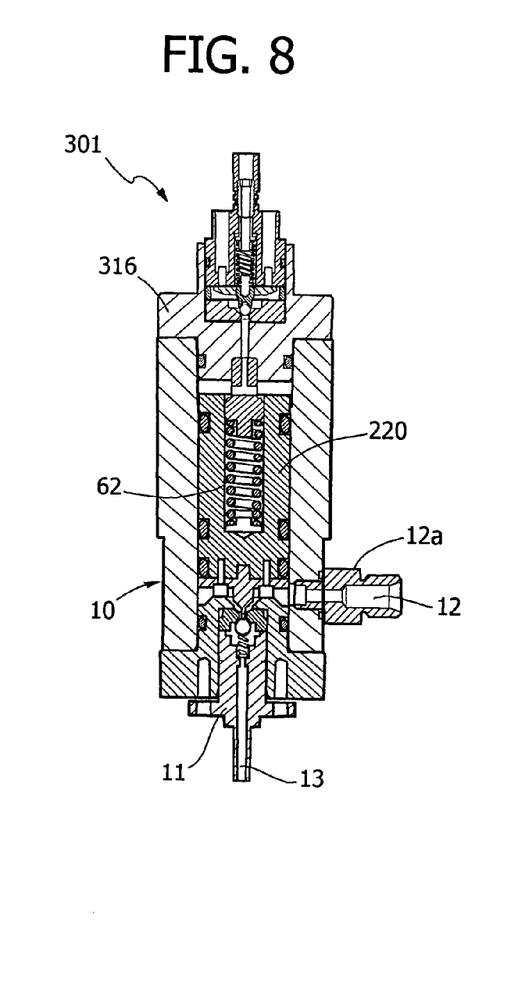
FIG. 8 is a cross-sectional view of a constructional embodiment of the valve of FIGS. 6 and 7.
Figure 9:
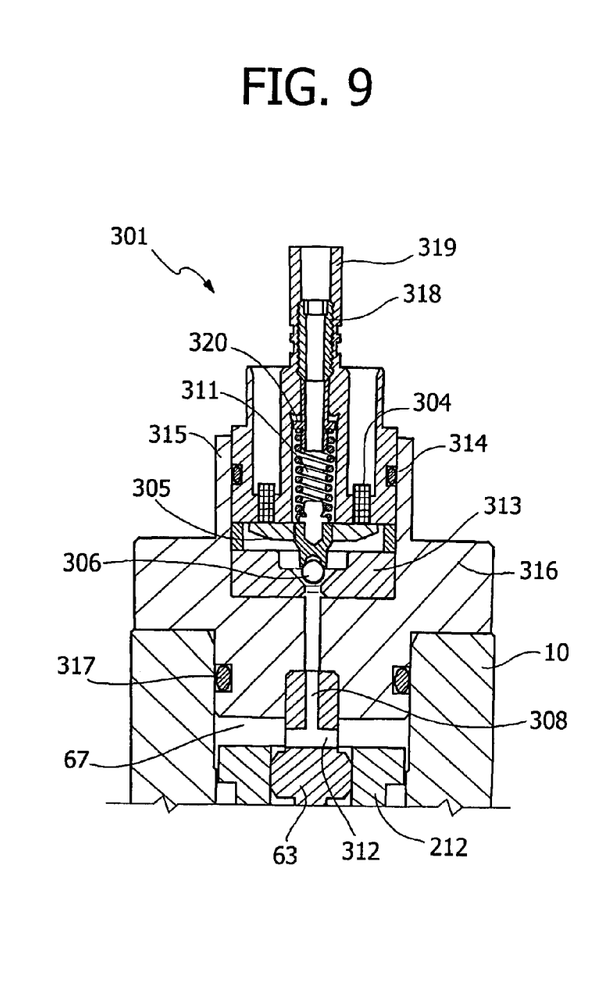
FIG. 9 illustrates a detail of FIG. 7 at an enlarged scale.

FIGS. 8 and 9 refer to a constructional embodiment of the valve 7 with a solenoid shutoff valve 301. In said figures, parts that are in common with those of FIGS. 3, 6 and 7 are designated by the same reference numbers.

As may be noted in particular in FIG. 9, in the constructional embodiment, the body proper of the solenoid shutoff valve 301, designated by 313, is mounted with the interposition of a seal ring 314 within a collar 315 of a closing element 316, mounted within one end of the bushing 212, constituting the body of the valve 7, with interposition of a seal ring 317. The seals 314, 317 enable an extremely high degree of reliability against any leakage, since they are seals of a "static" type, i.e., ones set between surfaces that not move with respect to one another.

The load of the spring 311 may be adjusted via a grub-screw 318, which is screwed within an outlet connector 319 for connection to the pipe 302 and is in contact with an arrest element 320 for the spring 311.

Of course, as already referred to above, the basic principle underlying the present invention is to provide a connection between a chamber of the pressure-reducing valve 7 that can be subjected to receiving flows of gas that have leaked from the area of the valve which is traversed by the gas that will be fed to the distribution rail 2 so as to prevent in any case the flow of leaked gas from possibly reaching the external atmosphere.

As has already been mentioned, when the engine is turned off (key off), any leakage through the seal ring 70 is collected in the chamber 67. When the engine is turned on (key on), the shutoff valve 301 set on the head of the pressure-reducing valve 7 opens, and the leaked gases are conveyed towards the intake manifold 300. It is important for the space inside the chamber 67, and in any case the space comprised between the pressure-reducing valve 7 and the solenoid valve 301, a space in which any leakage is collected, to be as small as possible, in such a way that, at starting of the engine, an excessive amount of methane, which could give rise to starting problems, is prevented from reaching the intake manifold 300. The interposition of the solenoid valve 301 between the pressure-reducing valve 7 and the intake manifold 300 is likewise possible also in conventional systems currently available on the market, with currently available pressure-reducing valves, since it is not essential for the shutoff valve to be incorporated in the regulation valve.

Of course, without prejudice to the principle of the invention, the details of construction and the embodiments may vary widely with respect to what is described and illustrated herein purely by way of example, without thereby departing from the scope of the present invention.

What is claimed is:

1. A system for supplying gas for an internal-combustion engine, comprising:
    a plurality of electromagnetically controlled injectors, associated to the various cylinders of the engine;
    a distribution manifold or rail, communicating with said injectors;
    a reservoir for supply of the rail, where pressurized gas is accumulated; and
    a pressure-reducing valve set in connection between the reservoir and the aforesaid rail,
    wherein the valve has a chamber connected to the system of air supply to the internal-combustion engine so as to enable any leakage of gas that reaches said chamber to be discharged therein
    wherein said chamber is connected to the intake manifold of the internal-combustion engine, and
    wherein the valve comprises:
    a valve body, with an inlet connector connected to the reservoir and an outlet connector connected to the rail;
    a restricted passage defined inside the valve body for communication between the inlet connector and the aforesaid outlet connector;

an open/close element for controlling communication through said restricted passage; and a piston member, mobile inside the valve body, for controlling said open/close element, having one end facing a first chamber within said valve body, set in the path of connection of the inlet connector with the outlet connector, and the opposite end facing a second chamber within said valve body, and the piston member is slidably moveable inside the valve body, wherein said second chamber is connected to the system for supply of air to the internal-combustion engine so as to be able to discharge therein any flow of gas that leaks from said first chamber to said second chamber, and wherein a shutoff valve is set in the connection between said second chamber and the system for supply of air to the internal-combustion engine, and wherein the shutoff valve is a solenoid valve, which is controlled in opening upon ignition of the engine and returns automatically into the closing condition when the engine is turned off, and wherein the shutoff valve is incorporated in the pressure-reducing valve.

2. A pressure-reducing valve for systems for supplying gas to internal-combustion engines, designed to be set in connection between a gas reservoir and a manifold or rail for distribution of the gas to a plurality of injector devices associated to the cylinders of the engine, said pressure-reducing valve being characterized in that it has an internal chamber for collection of any possible leakage of gas and incorporates a solenoid shutoff valve for controlling the connection between said internal chamber and the system for supply of air to the internal-combustion engine.

3. A system for supplying gas for an internal-combustion engine, comprising:

a plurality of electromagnetically controlled injectors, associated to the various cylinders of the engine;

a distribution manifold or rail, communicating with said injectors;

a reservoir for supply of the rail, where pressurized gas is accumulated; and a pressure-reducing valve set in connection between the reservoir and the aforesaid rail, wherein the valve has a chamber connected to the system of air supply to the internal-combustion engine so as to enable any leakage of gas that reaches said chamber to be discharged therein wherein said chamber is connected to the intake manifold of the internal-combustion engine, and the valve comprises:

a valve body, with an inlet connector connected to the reservoir and an outlet connector connected to the rail;

a restricted passage defined inside the valve body for communication between the inlet connector and the aforesaid outlet connector;

an open/close element for controlling communication through said restricted passage; and a piston member, mobile inside the valve body, for controlling said open/close element, having one end facing a first chamber within said valve body, set in the path of connection of the inlet connector with the outlet connector, and the opposite end facing a second chamber within said valve body, and the piston member is slidably moveable inside the valve body, and wherein said second chamber is connected to the system for supply of air to the internal-combustion engine so as to be able to discharge therein any flow of gas that leaks from said first chamber to said second chamber.

4. The supply system according to claim 3, wherein set in the connection between said second chamber and the system for supply of air to the internal-combustion engine is a shutoff valve.

5. The supply system according to claim 4, wherein the shutoff valve is a solenoid valve, which is controlled in opening upon ignition of the engine and returns automatically into the closing condition when the engine is turned off.

6. The supply system according to claim 4 or claim 5, wherein the shutoff valve is incorporated in the pressure-reducing valve.

7. The supply system according to claim 3, wherein said piston member is provided with a single seal gasket against any leakage of gas from said first chamber to said second chamber.

8. The supply system according to claim 7, wherein said piston member has a cylindrical body slidably mounted inside the valve body, with a front end facing a chamber set downstream of said restricted passage and provided with a cap designed to engage through said restricted passage to push said open/close element (210) away from a valve seat adjacent to said restricted passage.

9. The supply system according to claim 8, wherein there are envisaged spring means set between the piston member and the valve body to push the piston member towards its position in which it causes opening of the aforesaid open/close element.

* * * * *